United States Patent
Bendel et al.

(10) Patent No.: US 6,845,367 B2
(45) Date of Patent: Jan. 18, 2005

(54) PROCESS AND DEVICE FOR INTERNET PAYMENTS BY MEANS OF SECURITY MODULES

(75) Inventors: Peter Bendel, Boeblingen (DE); Horst Henn, Boeblingen (DE); Thomas Schaeck, Achern (DE); Roland Weber, Karlsruhe (DE)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 09/745,984

(22) Filed: Dec. 21, 2000

(65) Prior Publication Data

US 2001/0007129 A1 Jul. 5, 2001

(30) Foreign Application Priority Data

Dec. 23, 1999 (EP) .............................. 99125778

(51) Int. Cl.[7] .............................................. G06F 17/60
(52) U.S. Cl. .............................. 705/65; 705/44; 705/64; 705/67; 713/172; 235/380; 235/492
(58) Field of Search ............................... 705/64–79, 44; 713/172; 235/380, 492

(56) References Cited

U.S. PATENT DOCUMENTS 6,058,402 A * 5/2000 Feiken ........................ 708/144
6,283,369 B1 * 9/2001 Kurokawa et al. .......... 235/380
6,339,765 B1 * 1/2002 Maher ......................... 705/41
6,351,813 B1 * 2/2002 Mooney et al. ............. 713/185
2001/0037249 A1 * 11/2001 Fitzgerald et al. ........... 705/23

FOREIGN PATENT DOCUMENTS

EP          0924667 A2 *  6/1999  ........... G07F/19/00
WO       WO 98/49658    * 11/1998  ........... G07F/19/00

OTHER PUBLICATIONS

Deng et al. "A New On–Line Cash Scheme", 1997 ACM.*
Panurach, "Money in Electronic Commerce: Digital Cash, Electronic Fund Transfer, and Ecash", 1996 ACM.*

* cited by examiner

Primary Examiner—James P. Trammell
Assistant Examiner—Jalatee Worjloh
(74) Attorney, Agent, or Firm—William A. Kinnaman, Esq.; Heslin Rothenberg Farley & Mesiti P.C.

(57) ABSTRACT

The present invention describes a device and a method for performing cashless payments between a customer and a dealer. The advantages of the present invention lie in that payments can be performed over the Internet without implementing special payments commands stored in the customer chip card. It is sufficient to use a normal chipcard with a file structure. Such a file structure can be used in different file system cards and does not depend on the chipcard's operating system. Therefore, the inventive method can be used in a variety of chipcards without implementing special payments commands. The protocol is designed such that per payment only three steps of communication are required.

28 Claims, 2 Drawing Sheets

| Content of Customer Cipcard |
|---|
| Identification data of customer or customer card |
| Customer sequence number |
| Key A for reading and key B for writing |
| Availablility frame (credit line) |

FIG. 4A

| Content of Dealer Chipcard |
|---|
| Identification data of dealer or dealer security module |
| Sequence number of the dealer |
| Master key for generating key A |
| Master key for generating key B |
| "CreateUpdate-Command, CheckLastRecord-Comand, GetChallenge-Command" |

PROCESS AND DEVICE FOR INTERNET PAYMENTS BY MEANS OF SECURITY MODULES

PRIOR FOREIGN APPLICATION

This application claims priority from European patent application number 99125778.3, filed Dec. 23, 1999, which is hereby incorporated herein by reference in its entirety.

TECHNICAL FIELD

The present invention describes a process and device for internet payments by means of security modules, in particular chipcards, between dealer and customer.

BACKGROUND ART

Cashless payment by chipcards have become common in many areas of daily life. Here a distinction is made between account-related and non-account-related cashless payments with chipcards. An account-related chipcard requires an account with the bank issuing the card. If the customer wishes to process a cashless payment with his chipcard, he usually inserts the chipcard in the dealer's card reader machine, a data link is created to the customer's bank, the bank checks the presence of a covered account by the chipcard holder and if the account contains adequate cover, authorizes payment to the dealer. The disadvantage of this account-related chipcard lies in the fact that the creation of an on-line connection to the customer's bank can take a very long time or because of overload on the bank system, no connection can be established at all. In this case the customer must pay with cash or other payment means. If the customer has another account-related chipcard from another card-issuing bank, he can repeat the same process with this chipcard.

An alternative to the account-related chipcard is the so-called money card. The money card contains a specific money amount in the form of bytes which are transferred to the dealer system when payment is made. The advantage of this money card is that the customer can pay directly the dealer without on-line connection to his bank. A disadvantage of the money card is however its currently low acceptance by customers and the resulting lack of infrastructure.

Prior art cashless payment applications commonly require special payment instructions which have to be installed on the customer chipcard. Therefore, portability of such applications is strongly restricted. Implementations of special payment instructions depends on the operating system of the chipcard with the consequence that each operating system requires its own special commandos for execution of a cashless payment.

SUMMARY OF THE INVENTION

It is therefore an object of the present invention to prepare a process and a device for cashless payment transactions which combines the advantages of the account-related and non-account-related chipcard but without their disadvantages.

This object is solved by the features of various claims.

Further advantageous embodiments of the present invention are laid down in the claims.

The advantages of the present invention lie in that payments can be performed over the Internet without implementing special payments commands stored in the customer chip card. It is sufficient to use a normal chipcard with a file structure. Such a file structure can be used in different file system cards and does not depend on the chipcard's operating system. Therefore, the inventive method can be used in a variety of chipcards without implementing special payments commands. The protocol is designed such that per payment only three steps of communication are required.

BRIEF DESCRIPTION OF THE DRAWINGS

The present invention is described using a preferred embodiment with figures, where.

BEST MODE FOR CARRYING OUT THE INVENTION

Figure 1:
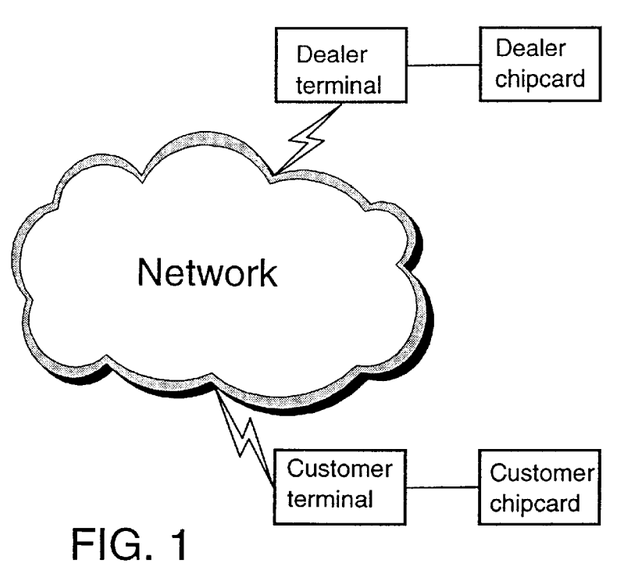
FIG. 1 shows a payment architecture for cashless payments via network between customer and dealer on which the inventive method is based.

FIG. 1 shows the main components of the present invention. The main components are:

Customer card (chipcard or mobile security module)
Dealer card (chipcard or security module)
Dealer terminal
Customer terminal
Network (Internet).

The dealer terminal preferably includes a data processing machine with a connected card reader and a security module in the form of a chipcard. The dealer's data processing machine runs a payment application program. The customer terminal preferably includes a data processing machine, a card reader and a security module in the form of a chipcard. The customer terminal also runs a payment application program or the customer loads certain applets for processing of a payment on his terminal. This is done preferably via the dealer system.

Customer Card

The customer card prepared for the proposed application is issued by the bank as an anonymous card similar to a telephone card. The card is identified by a unique card number. The card can be installed as a conventional customer card or SIM module in a mobile telephone or as an integral security module in a PC, pocket computer or other consumer machine. On issue, functions such as credit card or electronic purse can be activated. The customer can establish absolute maximum amounts or a total after on-line authorization for the card and/or for the various payment methods by the bank. These maximum values, known as the availability frame, are reduced accordingly after payment by the dealer card. The customer can also determine which payment methods shall also be protected by input of a personal identification number (PIN) where this is not already required for certain payment methods. The data can be given via a form or on-line at the kiosk or PC in the network. In particular a card intended for the relevant payment method can be used to identify the customer. The extra functions can also be requested before issue and released on the card before issue of the card. Activation of applications on the card takes place during the first on-line transaction with the customer card at the dealer server.

An advantage of the process lies in the fact that no sensitive customer data such as account number, credit card number etc. are stored on the customer card and hence misuse by unauthorized persons is excluded (credit card numbers are freely accessible in the present process for example and protected only the PIN which can be traced relatively easily).

The sum of measures serves to define the payment methods required by the customer for processing via machine and to minimize the risk to the customer on loss of the card. A customer can for example limit payments without PIN input to e.g. DM 50 and payments with PIN to DM 500 in total after the last on-line transaction.

This method allows customers who do not have a bank account, such as children for example, to have an electronic payment means with restricted availability frame.

The customer card also contains a secret signature key (symmetrical DES or asymmetric RSA) with which vouchers can be signed.

The customer card can be designed as a card with contacts or a contactless card. A consumer may have several cards, e.g. cash cards with availability frame nil and several cards for particular applications.

Dealer Card

The dealer card is issued by the bank. It can be issued in the same way as the customer card as a prestructured card and activated subsequently. The dealer card preferably stores the dealer identification, dealer sequence number and master keys for generating keys for reading and writing data into the customer chipcard.

Dealer Terminal

The dealer terminal is preferably a PC cash till to which is connected either a Smartcard reader with two read stations (slots) or two Smartcard readers. The reader for the customer can also be connected specifically by wireless transfer (e.g. infrared, bluetooth etc). The customer card reader may also be in the possession of the customer (mobile telephone, pocket computer etc.). The dealer card is usually permanently active in operation. The customer card is required only for the payment process. Readers for customers can also be equipped with keypads for PIN input and extra display. The process does not however in principle require readers with special security functions (such as for example money cards). Security is achieved solely by secured interaction between customer card and dealer card.

The dealer terminal can also be implemented in one of the conventional card readers with programmable functions.

The dealer terminal can also be implemented as a client/server system. The reader for the dealer card is connected to the server and the reader for the customer card to the client of the customer PC, mobile telephone, pocket computer etc.

All machines have a network connection with which they can have access to the bank server. This connection is specifically required only for data exchange between dealer and customer.

Customer Terminal

The customer terminal is either a PC, a pocket computer (organizer), a mobile telephone or other consumer machine, each with a Smartcard reader. All machines have a network connection with which they can gain access to the bank server.

Network

All components have temporary access to a network. Preferably an Internet or INTRANET is used for this. The process requires no particular security functions for operation of the system components. It is recommended that the dealer card or customer card also be used to secure access to the bank portal server.

Figure 2:
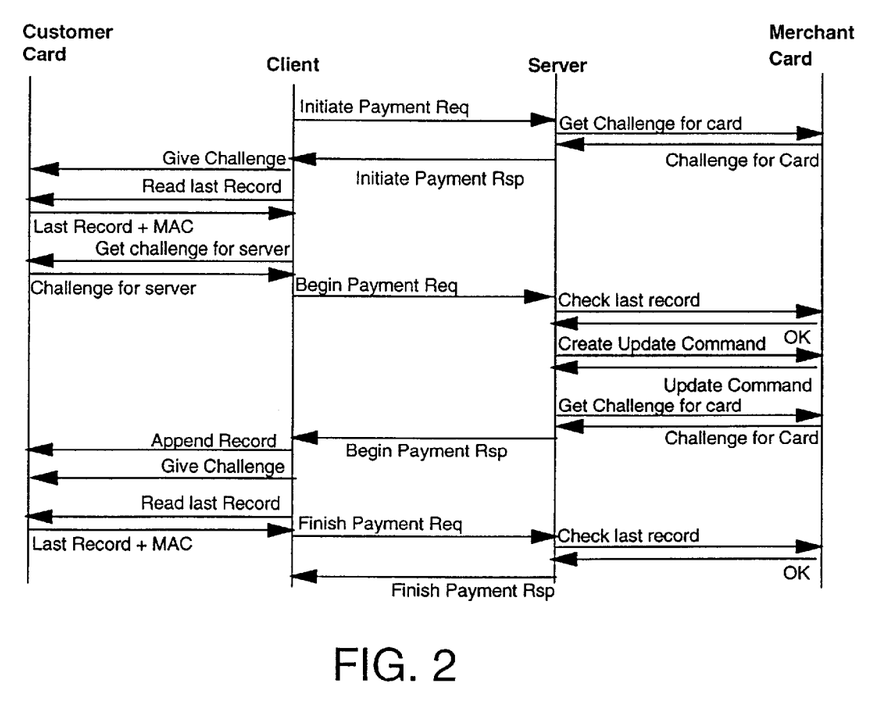
FIG. 2 shows the inventive method for cashless payment between customer and dealer.

FIG. 2 shows a preferred embodiment of the method according to the invention using the individual method steps for cashless payment via an on-line connection between customer and dealer. The customer has a customer terminal as described in FIG. 1.

Customer inserts the customer chipcard (customer card) in the card reader and generates a connection using a browser to the dealer terminal. There the customer selects for example an on-line shopping application, selects products and gives a delivery address. This on-line transaction is usually terminated by entering a payment method and confirmation of purchase.

In the application of the method according to the invention, the customer selects the chipcard as payment method. Cashless payment via the customer card takes place in the following steps:

1. Insertion of customer card in the customer card reader if this has not previously been done. The customer card preferably communicates via an applet with the dealer payment application on the dealer's server. The applet generates chipcard commands in the form of APDUs, sends these to the customer card and analyzes these. The analyzed results are sent by the applet to the dealer payment application. The customer card is prepared for the method according to the invention.

The non-volatile memory of the customer card preferably contains the following data which are stored in a record of the file:

a) Identification data about customer or customer chipcard;
b) Key A for reading and key B for writing;
c) customer sequence number;
d) Credit line or availability frame which the bank grants the customer.

2. Reading of data a) of the customer card (customer data) via chipcard commands. These data are preferably transferred by the applet using HTTP protocol to the dealer payment application in order to initiate the payment and to request a random number as challenge for the customer chip card (initiate payment request) and deposited in the volatile memory of the dealer terminal.

3. The dealer terminal requests from the dealer card a new session. Hereby the dealer terminal or the dealer payment application sends the customer data to the dealer chipcard.

4. The dealer chipcard generates a new session and derives the key A and B from the customer data and the master keys stored in the dealer chipcard. The dealer terminal receives from the dealer chipcard a new session-ID and requests a random number as challenge for the customer terminal from the dealer chipcard.

5. The dealer card generates a random number, stores this random number in connection with the session generated according to step 3 and sends the number to the server.

6. The server returns the random number received from the dealer card to the client (Initiate Response).

7. The client sends the random number received from the dealer card to the customer chipcard especially with support of the card commando "GiveChallenge".

8. The customer chipcard reads the last record at the file with a MAC which has been calculated by the customer chipcard under assistance of the random number received according to step 7.

9. Client requests a random number for the server from the customer chipcard.

10. Customer chipcard creates a random number, stores the random number and sends the random number to the client.

11. Client sends the last record with the attached MAC and the random number for the server to the server (Begin Payment request).

12. Server receives the record with the MAC and the random number.

13. Dealer chipcard (SAM) examines the last record by using the "CheckLastRecord-command" and assigns the session parameter determined by step 4.

14. Dealer chipcard uses for examination the key A which has been derived from the master key A and the random number which has been generated by step 5. Dealer chipcard stores the record in connection with that session and returns the result of the examination to the server.

15. In the case of validation of the last record, the server generates an update instruction by using the "CreateUpdate-Command" instruction for writing a new record into the file of the customer chipcard. That update instruction contains as parameter the session ID which has been generated in step 4, the random number which has been received by step 12, the amount to be paid, the current dealer sequence number and dealer identification number as well the present time and date.

16. Dealer chipcard creates an update instruction by using the parameters which have been received with the "CreateUpdateCommand" and the key A derived by step 4 and returns it to the server. The data for the update instruction are created by modification of the data created by step 14. Customer sequence number is increased by one, the dealer identification and dealer sequence are replaced by the numbers stored in the dealer chip card, the amount to be paid is settled by the amount of step 15, the limit is reduced by amount to be paid and the data in the record is settled by the data according to step 15.

17. Server requests a random number for the customer chipcard from the dealer chipcard.

18. Dealer chipcard creates a random number, stores it in connection with the session and sends the random number to the server.

19. Server returns a message to the client including the update instruction according to step 16 and random number according to step 18 (Begin Payment Response).

20. Client receives that update instruction as well as the random number.

21. Client sends that update instruction to the customer chipcard for writing a new record content.

22. Customer chipcard receives the update instruction, examines and executes it. Key B and the random number from step 10 are used for examination.

23. Client sends the random number of step 18 by using for example "GiveRandom" instruction to the customer chipcard.

24. Client reads the last record with a MAC. The MAC is calculated by the card using the random number and key A.

25. Client returns the last record with the MAC to the server (Finish Payment Request).

26. Server receives the message from the client and examines the received record by using the chipcard "CheckLastRecord-command". For examination the dealer chipcard uses the random number which has been created by step 18 and key A which has been derived by step 4. In the case, the examination is successful the payment is completed.

27. Server sends a confirmation to the client that payment is successfully completed.

Figure 3:
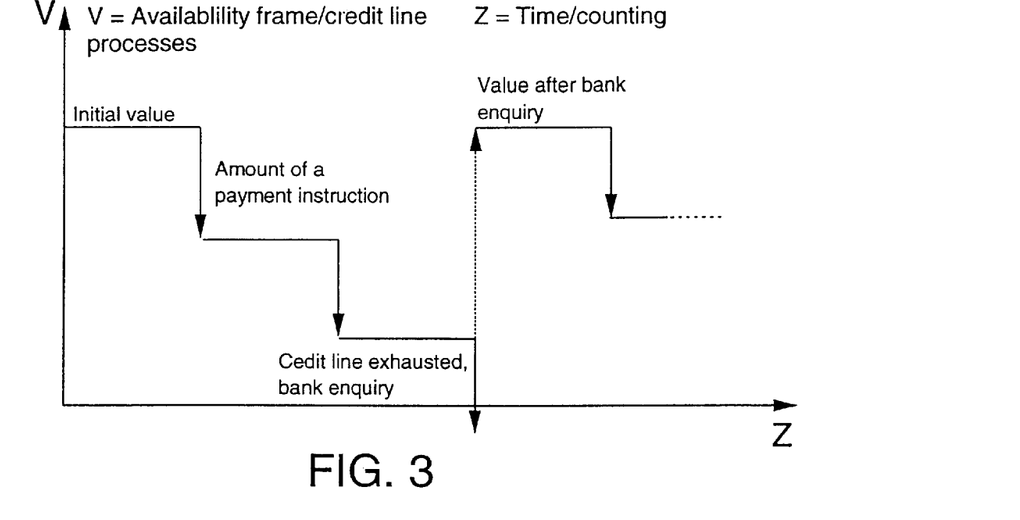
FIG. 3 shows the implementation according to the invention of an availability frame (credit line) in the customer card.

FIG. 3 shows the implementation of the availability frame/credit line using the example procedure.

The availability frame granted by the bank (amount limit) is stored as an amount in the non-volatile memory on the customer card. The customer makes payments 1 and 2 which lead to a reduction of the availability frame by amounts b1 and b2. Payment 3 leads to the availability frame being exceeded.

Preferably the existing availability frame is checked by the dealer payment application on readout of customer data from the customer card. If the existing availability frame does not cover the payment, the dealer receives from the dealer payment application a message that the payment can be accepted.

Figure 4A:
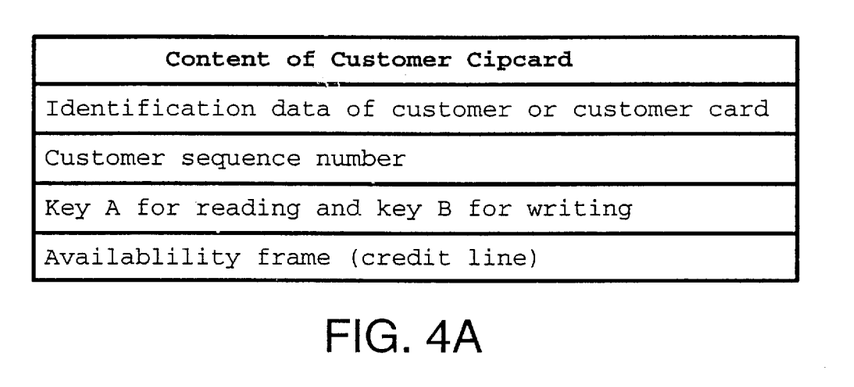
FIG. 4A shows the content of the customer card for performance of the method according to FIG. 2.

FIG. 4A shows the customer card content for performance of the present invention.

Here the customer card contains at least the following information:

identification data of customer or customer card;

customer sequence number;

key A for reading and key B for writing;

availability frame (credit line).

This information is stored in a record in a non-volatile memory of the customer card and is read by the dealer payment. Preferably customer card has a file structure with cyclic files.

These cyclic files allow as operations reading of the last record with a MAC (Message Authentification Code) generated by key A as well writing the next record with a MAC generated by key B. Only the dealer chipcard is allowed to write a new entry into the record of the file. The customer card does not contain card specific instructions.

During payment transaction following information are loaded into the record of the customer chipcard by the dealer chipcard:

sequence number of the dealer;

identification data of the dealer or dealer chipcard;

amount to be paid;

remaining limit after payment;

date/time.

The last record of the file of the customer chipcard is initialized during the card manufacturing as follows:

sequence number of the customer: 0 identification data of the customer: 16 byte sequence number of the dealer: 16 0-bytes amount to paid:0 remaining limit after payment:0 date/time:0.

Figure 4B:
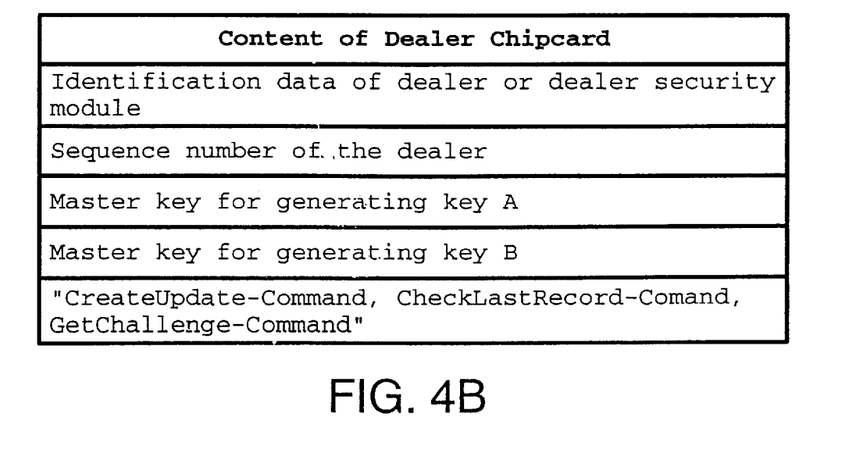
FIG. 4B shows the content of the dealer card for performing the method according to FIG. 2.

FIG. 4B shows the dealer card content or content of the security module of the dealer for performance of the present invention. The dealer security module contains at least the following information:

identification data of dealer or dealer security module;

sequence number of the dealer;

master key for key A;

master key for key B.

The dealer chipcard derives the keys A and B from the master keys and the identification data of the customer or card. The dealer chipcard supports the instructions "CheckLastRecord", "CreateUpdateCommand" and "GetChallengeforCard".

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. Method for cashless payments with at least the following components:
   a) a dealer terminal with a dealer payment application for processing a cashless payment;
   b) a dealer security module or dealer chipcard;
   c) a reader for reading a customer chipcard or mobile security module; and
   d) at least one customer chipcard or mobile security module with a file structure containing at least one record for storing payment information, said method comprising:
      aa) initiating payment request by following steps:
         Reading of customer identification information which are stored in said customer chipcard or mobile security module by said reader and sending them to said dealer terminal;
         execution of an authentification protocol for authentificating said customer chipcard or mobile security module based on said customer identification;
         reading of customer information stored in a record (record information) of a file in said customer chipcard or mobile security module by said reader;
         sending of said record information including authentification protocol information from said reader to said dealer terminal; and
         examining the validity of said record information by said authentification protocol information by means of chipcard instruction "CheckLastRecord" in said dealer chipcard;
      bb) beginning payment request by:
         creating of an update instruction for writing a new record in said file of said chipcard or mobile security by means of chipcard instruction "CreateUpdateCommand" by said dealer chipcard; and
         sending of said update instruction including authentification protocol information to said reader;
      cc) beginning payment response by:
         sending of said update instruction to said customer chipcard or mobile security module by said reader; and
         examining the validity of said update instruction by using said authentification protocol information, and if successful, executing of said update instruction by overwriting of said record or by creating a new last record (new record information) into said customer chipcard or said mobile security module; and
      dd) finishing of payment by:
         sending of said new record information including authentification protocol information to said dealer terminal; and
         examining of the validity of said new record information by using said attached authentification protocol information by means of "CheckLastRecord command".

2. Method according to claim 1, wherein said record includes following customer information:
   identification data of customer or customer card;
   customer sequence number; and
   availability frame (credit line).

3. Method according to claim 2 wherein said updating instruction is created by the following:
   sending said "CreateUpdateCommand" from said dealer terminal to said dealer chipcard; and
   modifying said information which are stored in said record in the volatile memory of said dealer chipcard by following:
   increasing said customer sequence number;
   replacing identification of the dealer which is stored in said record by said identification of the dealer which is available to said "CreateUpdateCommand";
   replacing amount to be paid stored in said record by said amount to be paid which is provided by the "CreateUpdateCommand";
   reducing credit limit by the amount to be paid; and
   replacing date and time which are stored in said record by said date and time provided by said "CreateUpdateCommand".

4. Method according to claim 1, wherein said dealer chipcard includes following dealer information:
   identification data of dealer or dealer security module;
   dealer sequence number;
   master key for generating key A; and
   master key for generating key B.

5. Method according to claim 1, wherein said reader comprises:
   a computer; and
   a device for reading said customer chipcard.

6. Method according to claim 1, wherein communications between said dealer terminal and said reader take place via SSL (secure sockets layer) as the transmission protocol.

7. Method according to claim 1, wherein the authentification protocol is executed by:
   generating a random number by said dealer chipcard;
   sending said random number from said dealer chipcard via said dealer terminal to said reader;
   sending said random number with support of chipcard instruction "GiveChallenge" to said customer chipcard or said mobile security module;
   storing said random number in the volatile memory of said chipcard;
   reading the last record in the non-volatile memory of said chipcard;
   generating a digital signature or MAC by said customer chipcard or mobile security module which takes account of customer identification information, said random number and said key A;
   requesting a random number from said customer chip card; and
   sending last record information with the digital signature or the MAC and the random number via said reader to said dealer terminal.

8. Method according to claim 7, wherein said "CreateUpdateCommand" obtains one or more of the following information:
   random number which is provided by said customer chipcard;
   identification data of the customer or the customer card;

amount to be paid;

identification information of the dealer or said dealer chipcard; and dealer sequence number date and time.

9. Method according to claim 8 wherein said updating instruction is created by the following:

sending said "CreateUpdateCommand" from said dealer terminal to said dealer chipcard; and modifying said information which are stored in said record in the volatile memory of said dealer chipcard by following:

increasing said customer sequence number;

replacing said identification of the dealer which is stored in said record by said indentification of the dealer which is available to said "CreateUpdateCommand";

replacing said amount to be paid stored in said record by said amount to be paid which is provided by the "CreateUpdateCommand";

reducing a credit limit by the amount to be paid; and replacing the date and time which are stored in said record by said date and time provided by said "CreateUpdateCommand".

10. Method according to claim 1, wherein said record is part of a cyclic file.

11. Method according to claim 1, wherein the dealer terminal is a PC cash till or a data processing machine with a read device with a read station for the customer chipcard or a mobile security module and a read station for the dealer security module or dealer card, or in each case a read machine for the customer chipcard or a mobile security module and a read machine for the dealer security module or dealer card.

12. Method according to claim 1, wherein the reader for the dealer card or dealer security module is a firmly installable component of the PC cash till or the data processing machine.

13. Method according to claim 1, wherein the read device for the customer chipcard is a mobile telephone and communication between the mobile telephone and dealer terminal takes place via a wireless data connection.

14. Method according to claim 1, wherein the read device for the customer card or mobile security module is arranged in a mobile data processing machine, where a data connection to the bank terminal is created via the mobile data processing machine.

15. Method according to claim 1, wherein the customer information stored in said record of said customer chipcard or mobile security module is read via an applet and sent to the dealer application.

16. Method according to claim 15, wherein the applet is stored in the dealer terminal and is transferred to the customer terminal on creation of communication between dealer terminal and customer chipcard or mobile security module.

17. Method according to claim 1, wherein the said update instruction is signed by the customer chipcard or mobile security module with a symmetrical process or an asymmetric algorithm.

18. A system for cashless payments with at least the following components:

a) a dealer security module or dealer chipcard;

b) a reader for reading a customer chipcard or mobile security module;

c) at least one customer chipcard or mobile security module with a file structure containing at least one record for storing payment information d) a dealer terminal with a dealer payment application for processing a cashless payment, said dealer terminal containing at least:

aa) a data processing machine on which a computer program product for reading and processing information from customer chipcard or mobile security module and for communication with the computer program product installed on the reader is installed; and bb) a read device for reading the information on the dealer card or dealer security module; and e) a customer terminal containing at least:

aa) a data processing machine with a computer program product for reading and processing information from the customer chipcard or mobile security module and for communication with the computer program product installed on said dealer terminal; and bb) a read device comprising said reader for reading information on the customer card or mobile security module, said system comprising:

aaa) means for initiating payment request by:

reading customer identification information which is stored in said customer chipcard or mobile security module by said reader and sending them to said dealer terminal:

ddd) means for finishing of payment by:

sending said new record information including authentification protocol information to said dealer terminal; and examining of the validity of said new record information by using said attached authentification protocol information by means of a "CheckLastRecord command".

19. The system of claim 18, wherein the dealer terminal is a PC cash till or data processing machine with a read device with a read station for the customer chipcard or a mobile security module and a read station for the dealer security module or dealer card or in each case a read device for the customer chipcard or a mobile security module and a read device for the dealer security module or dealer card.

20. The system of claim 19, wherein the read device for the dealer card or the dealer security module is a firmly installable component of the PC cash till or data processing machine.

21. The system of claim 18, wherein the data processing machine is a client-server system, where the read device for the dealer card or the dealer security module is arranged on the server and the read device for the customer chipcard or mobile security module is arranged on the client system.

22. The system of claim 18, wherein the read device for the customer chipcard is a mobile telephone and communication between the mobile telephone and dealer terminal takes place via a wireless data connection.

23. The method of claim 1, wherein the components further include a customer terminal comprising at least:

a) a data processing machine with a computer program product for reading and processing information on the customer chipcard or mobile security module and for communication with the computer program product on the dealer terminal;

b) a read device for reading the information on the customer chipcard or mobile security module; and c) a communication module for creation of an on-line data connection.

24. The method of claim 1, wherein the dealer terminal comprises at least:

a) a data processing machine with an installed computer program product for communication between dealer chipcard/security module, data processing machine of the dealer and read device for the customer;

b) a read device for reading the information on the dealer chipcard or dealer security device; and c) a communication module for creation of an on-line data connection.

25. The method of claim 1, wherein the dealer security module or dealer chipcard comprises at least:
a) a processor; and
b) a non-volatile memory with at least the following information:
identification data of dealer or dealer security module;
sequence number of the dealer;
master key for generating key A;
master key for generating key B; and
"CreateUpdate-Command", "CheckLastRecord-command" and "GetChallenge-Command".

26. The method of claim 1, wherein the customer chipcard or mobile security module comprises at least:
a) a processor;
b) a non-volatile memory with at least the following information:
identification data of customer or customer card;
customer sequence number;
key A for reading and key B for writing; and
availability frame (credit line).

27. At least one program storage device readable by a machine, tangibly embodying at least one program of instruction executable by the machine to perform a method of cashless payments with at least the following components:
a) a dealer terminal with a dealer payment application for processing a cashless payment;
b) a dealer security module or dealer chipcard;
c) a reader for reading a customer chipcard or mobile security module; and
d) at least one customer chipcard or mobile security module with a file structure containing at least one record for storing payment information, said method comprising:
aa) initiating payment request by following steps:
Reading of customer identification information which are stored in said customer chipcard or mobile security module by said reader and sending them to said dealer terminal;
execution of an authentification protocol for authentificating said customer chipcard or mobile security module based on said customer identification;
reading of customer information stored in a record (record information) of a file in said customer chipcard or mobile security module by said reader;
sending of said record information including authentification protocol information from said reader to said dealer terminal; and
examining the validity of said record information by said authentification protocol information by means of chipcard instruction "CheckLastRecord" in said dealer chipcard;
bb) beginning payment request by:
creating of an update instruction for writing a new record in said file of said chipcard or mobile security by means of chipcard instruction "CreateUpdateCommand" by said dealer chipcard; and
sending of said update instruction including authentification protocol information to said reader;
cc) beginning payment response by:
sending of said update instruction to said customer chipcard or mobile security module by said reader; and
examining the validity of said update instruction by using said authentification protocol information, and if successful, executing of said update instruction by overwriting of said record or by creating a new last record (new record information) into said customer chipcard or said mobile security module; and
dd) finishing of payment by:
sending of said new record information including authentification protocol information to said dealer terminal; and
examining of the validity of said new record information by using said attached authentification protocol information by means of "CheckLastRecord command".

28. The at least one program storage device of claim 27, wherein the authentification protocol is executed by:
generating a random number by said dealer chipcard;
sending said random number from said dealer chipcard via said dealer terminal to said reader;
sending said random number with support of chipcard instruction "GiveChallenge" to said customer chipcard or said mobile security module;
storing said random number in the volatile memory of said chipcard;
reading the last record in the non-volatile memory of said chipcard;
generating a digital signature or MAC by said customer chipcard or mobile security module which takes account of customer identification information, said random number and said key A;
requesting a random number from said customer chip card; and
sending last record information with the digital signature or the MAC and the random number via said reader to said dealer terminal,
wherein said "CreateUpdateCommand" obtains one or more of the following information:
random number which is provided by said customer chipcard;
identification data of the customer or the customer card;
amount to be paid;
identification information of the dealer or said dealer chipcard; and
dealer sequence number date and time, and
wherein said updating instruction is created by the following:
sending said "CreateUpdateCommand" from said dealer terminal to said dealer chipcard; and
modifying said information which are stored in said record in the volatile memory of said dealer chipcard by following:
increasing said customer sequence number;
replacing said identification of the dealer which is stored in said record by said indentification of the dealer which is available to said "CreateUpdateCommand";
replacing said amount to be paid stored in said record by said amount to be paid which is provided by the "CreateUpdateCommand";
reducing a credit limit by the amount to be paid; and
replacing the date and time which are stored in said record by said date and time provided by said "CreateUpdateCommand".

* * * * *

UNITED STATES PATENT AND TRADEMARK OFFICE
CERTIFICATE OF CORRECTION

PATENT NO. : 6,845,367 B2
DATED : January 18, 2005
INVENTOR(S) : Bendel et al.

It is certified that error appears in the above-identified patent and that said Letters Patent is hereby corrected as shown below:

Column 10,
Line 17, delete "aaa) means for initiating payment request by:
reading customer identification information which is stored in said customer chipcard or mobile security module by said reader and sending them to said dealer terminal;" and insert the following:

--aaa) means for initiating payment request by:
reading customer identification information which is stored in said customer chipcard or mobile security module by said reader and sending them to said dealer terminal;

executing an authentification protocol for authentificating said customer chipcard or mobile security module based on said customer identification;

reading customer information stored in a record (record information) of a file in said customer chipcard or mobile security module by said reader;

sending said record information including authentification protocol information from said reader to said dealer terminal; and examining the validity of said record information by said authentification protocol information by means of chipcard instruction "CheckLastRecord" in said dealer chipcard;

bbb) means for beginning payment request by;

creating an update instruction for writing a new record in said file of said chipcard or mobile security by means of chipcard instruction "CreateUpdateCommand" by said delaer chipcard; and sending said update instruction including authentification protocol information to said reader;

ccc) means for beginning payment response by;

sending said update instruction to said customer chipcard or mobile security module by said reader; and examining the validity of said update instruction by using said authentification protocol information, and if successful, executing said update instruction by overwriting said record or by creating a new last record (new record information) into said customer chipcard or said mobile security module; and--

Signed and Sealed this

Twenty-ninth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,845,367 B2  Page 1 of 1
DATED : January 18, 2005
INVENTOR(S) : Bendel et al.

It is certified that error appears in the above-identified patent and that said Letters Patent is hereby corrected as shown below:

Column 10,
Line 17, delete "aaa) means for initiating payment request by:
reading customer identification information which is stored in said customer chipcard or mobile security module by said reader and sending them to said dealer terminal;" and insert the following:

--aaa) means for initiating payment request by:
reading customer identification information which is stored in said customer chipcard or mobile security module by said reader and sending them to said dealer terminal;

executing an authentification protocol for authentificating said customer chipcard or mobile security module based on said customer identification;

reading customer information stored in a record (record information) of a file in said customer chipcard or mobile security module by said reader;

sending said record information including authentification protocol information from said reader to said dealer terminal; and examining the validity of said record information by said authentification protocol information by means of chipcard instruction "CheckLastRecord" in said dealer chipcard;

bbb) means for beginning payment request by;

creating an update instruction for writing a new record in said file of said chipcard or mobile security by means of chipcard instruction "CreateUpdateCommand" by said dealer chipcard; and sending said update instruction including authentification protocol information to said reader;

ccc) means for beginning payment response by;

sending said update instruction to said customer chipcard or mobile security module by said reader; and examining the validity of said update instruction by using said authentification protocol information, and if successful, executing said update instruction by overwriting said record or by creating a new last record (new record information) into said customer chipcard or said mobile security module; and--

This certificate supersedes Certificate of Correction issued March 29, 2005.

Signed and Sealed this

Fourteenth Day of June, 2005

JON W. DUDAS
*Director of the United States Patent and Trademark Office*